3,438,507
MEAT TRAY
Carl H. Kreuger, 9017 Trask Ave.,
Playa Del Rey, Calif. 90261
Filed Jan. 6, 1967, Ser. No. 607,688
Int. Cl. A47g 29/14
U.S. Cl. 211—71                                4 Claims

ABSTRACT OF THE DISCLOSURE

The disclosure is of a meat tray having a bottom wall and side walls to form a container. The bottom wall has a plurality of mounds or "pips," formed as protrusions drawn from the plane of the parent material. At least the apex of the protrusions are thin enough to allow air permeation. In some materials the tips are ruptured to allow air to enter, but are so fine they behave in the principle of a siphon valve system.

Additionally, the disclosure is directed to the arrangement of ribs to stiffen thin material but in a pattern to promote air circulation to the atmosphere.

---

The invention is in the concept of forming a meat tray which is transparent for inspection, and is formed to support the meat on random spot mounds, which mounds are air permeable, and interspersed with lesser support and stiffening ribs to form an air circulation system connected to atmosphere.

The invention is summarized in the following general objects:

(1) Creating a minimum contact between plastic and meat by having a number of protrusions in the interior of the tray. These protrusions also provide airflow and circulation around and below the meat.

(2) The sharp points of the protrusions are very thin as at this point the sheet material is stretched to a thickness where "air breathing" is possible. In other words, at point of contact between plastic and meat, the plastic is thin enough to allow air permeation, thus preventing discoloration of the meat.

(3) The ribs which are necessary to strengthen the relatively thin plastic into a more rigid construction are interrupted at strategic places. They do not form a closed pattern anywhere, but overlap for strength. This will result in airflow communication to the surface. Even if the meat should "sag," it would be supported by the high points of the ribs, guaranteeing minimum contact between plastic and meat and maintain air circulation to prevent discoloration.

Figure 1:
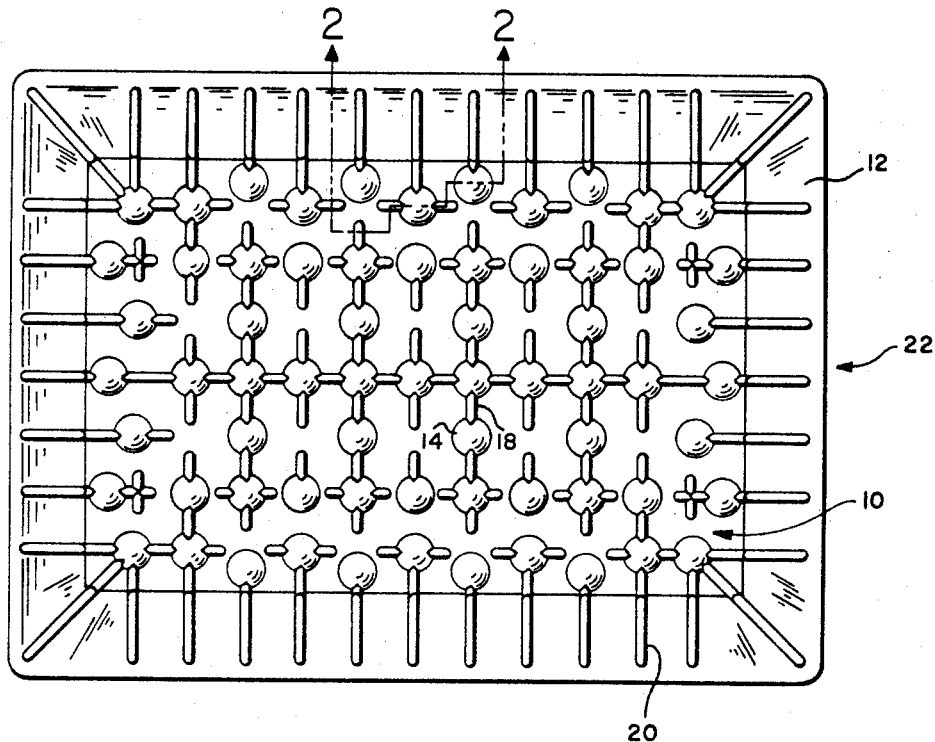
Figure 2:
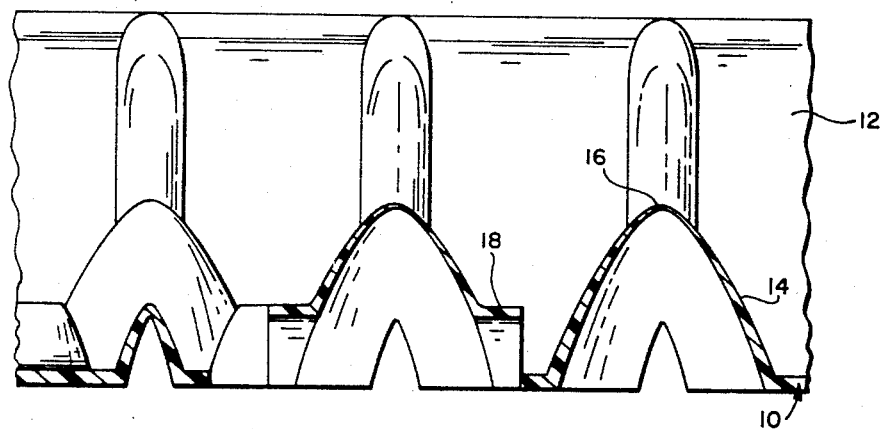

Other objects and a better understanding of the invention will be disclosed in the detailed description, wherein:

FIGURE 1 is a plan view of a transparent meat tray embodying the features of the invention; and FIGURE 2 is a greatly enlarged section taken along line 2—2 of FIGURE 1.

A preferred embodiment of the invention is incorporated in a meat tray as illustrated in the drawing. It is preferably transparent. Transparent meat trays have the advantage of allowing the customer to turn the pack upside down to inspect the quality of the meat from both sides.

The ordinary plastic tray, however, has a disadvantage in that it has to be thick enough to be stable, thus losing the ability to "breathe" and allow air circulation to pass, which would prevent discoloration of the meat. Thus, the meat turns brown where it touches the tray. Obviously, the conventional paper tray does not have this disadvantage, but as it is very absorbent, the meat is glued against the pulp of this particular type tray and, thus, also eventually prevents proper air circulation. This "drying out" process might result in reducing the weight of the meat, which could mean a loss to the seller.

The illustrated tray is formed from sheet material. The preferred material is oriented polystyrene or ridged poly vinyl chloride (P.V.C.). These materials are quite flexible in sheet form, and although slightly more stable when shaped into tray form, would require thick sheet sections for useful stability. Thick sections are self-defeating in that they are not permeable, and because the cost of material is greatly increased.

Therefore, a tray according to this invention is made with a bottom wall 10 and four side walls 12. The bottom wall is studded by a plurality of mounds 14, which are sometimes referred to as "pips."

In this preferred embodiment the mounds are drawn from the parent sheet stock. Thermoplastic material will draw out as it is formed over a hot protrusion mold. This property is employed to cause the mounds to do a double function. First, the several mounds support the meat such that much of the meat surface is suspended out of direct contact with the bottom 10. Secondly, although the sheet material is air permeable when used in thin sheets, the mounds are stretched to cause the side walls to taper from the thickness of the base material to the crown apex 16. According to the material selected, the apex is stretched to not over .010 inch, and may be actually drawn to cause minute ruptures. Although cast structures may be made with central fine holes, the variable wall thickness of the drawn pips is preferred because of the permeability over a greater crown area.

Minute ruptures are acceptable, and for some meats actually preferred. The ruptures will allow much greater air circulation than mere permeable walls will provide, and therefore offsets the sealing effect of the meat in direct contact. The crown area around the apex is able to supply the additional air desired.

Thin wall sections are desired for at least two reasons. First, in thin sections the entire wall is air permeable. Thin wall sheet is sold for food wrap for home and commercial use. Secondly, the cost is reduced.

It has been discovered according to this invention, that stiffening ribs can be used to make the unduly flexible sheet sufficiently stiff, and in addition serve another desired function.

Solid meat sections, when first packaged in the tray, will bridge from mound to mound, but in time will sag and gradually close off the air circulation paths. Hence, ribs 18 along bottom wall 10 are made of lesser height than mounds 14, and are therefore not so thin of wall and are stronger. Being of lower profile, there is air circulation over them when the meat is first displayed. Usually the meat is not held in the package long before it is sold and used. But if it is held for longer periods, and does not sag, it will contact the tops of ribs 18 and be further supported away from the bottom.

The ribs 18 are not continuous, but are arranged to provide a combination of strength and air circulation. The illustrated rib pattern provides a maze which is not closed off into chambers by a cap of meat. Each maze leads to a side wall 12.

Side walls 12 are segmented and strengthened by ribs 20. These ribs provide air connection of the bottom wall maze to atmosphere. The term "atmosphere" implies the upper area, whether or not the tray is actually enclosed in another wrapper.

The illustrated tray is formed into two sections by a continuous central row 22 of the reinforcement ribs, but each section is connected to atmosphere at its adjacent side wall.

Whereas the present invention has been shown and described herein in what is conceived to be the best mode contemplated, it is recognized that departures may be made therefrom within the scope of the invention which is, therefore, not to be limited to the details disclosed herein, but it is to be afforded the full scope of the invention as hereinafter claimed.

What is claimed is:

1. A plastic meat tray comprising:
   a bottom wall and surrounding side walls defining a container, said bottom wall formed into a plurality of mounds closely spaced from one another a distance such that solid food meat supported by said bottom wall will be supported at least half by said mounds and will be suspended from contact at least in the area surrounding each mound, each mound having an air permeeable crown; said crown being substantially imperforate and impermeable to meat fluids flowing downwardly over the mound.

2. A tray as defined in claim 1 further characterized in that:
   said mounds are drawn from a parent sheet of material forming said bottom wall and are progressively thinned to form a taper cross section wall thickness ending in a peak area permeable to air.

3. A tray as defined in claim 2, further characterized in that said peak is unbroken and of air permeable thickness, or is ruptured in such fine openings that air will pass but meat fluids will resist passing.

4. A tray as defined in claim 2, further characterized in that there are lateral structural stiffening ribs of lesser prominence radiating from many of the said mounds, forming an open pattern maze accessible along the edges of said bottom wall; and
   a plurality of upwardly extending ribs in said side walls defining channels from the top of said side walls down to said maze pattern in said bottom wall;
   whereby, meat in said tray will be caused to bridge over areas of said maze and allow air to circulate from said permeable peaks and lateral channel openings.

References Cited
UNITED STATES PATENTS

| D. 194,814 | 3/1963 | Engles et al. | D9—219 |
| D. 200,178 | 1/1965 | Barnes | D9—243 X |
| 2,880,046 | 3/1959 | Black | 211—71 |
| 3,001,661 | 9/1961 | Flynn | 217—27 |

CHANCELLOR E. HARRIS, *Primary Examiner.*

WILLIAM D. LOULAN, *Assistant Examiner.*

U.S. Cl. X.R.

211—126; 99—181